UNITED STATES PATENT OFFICE.

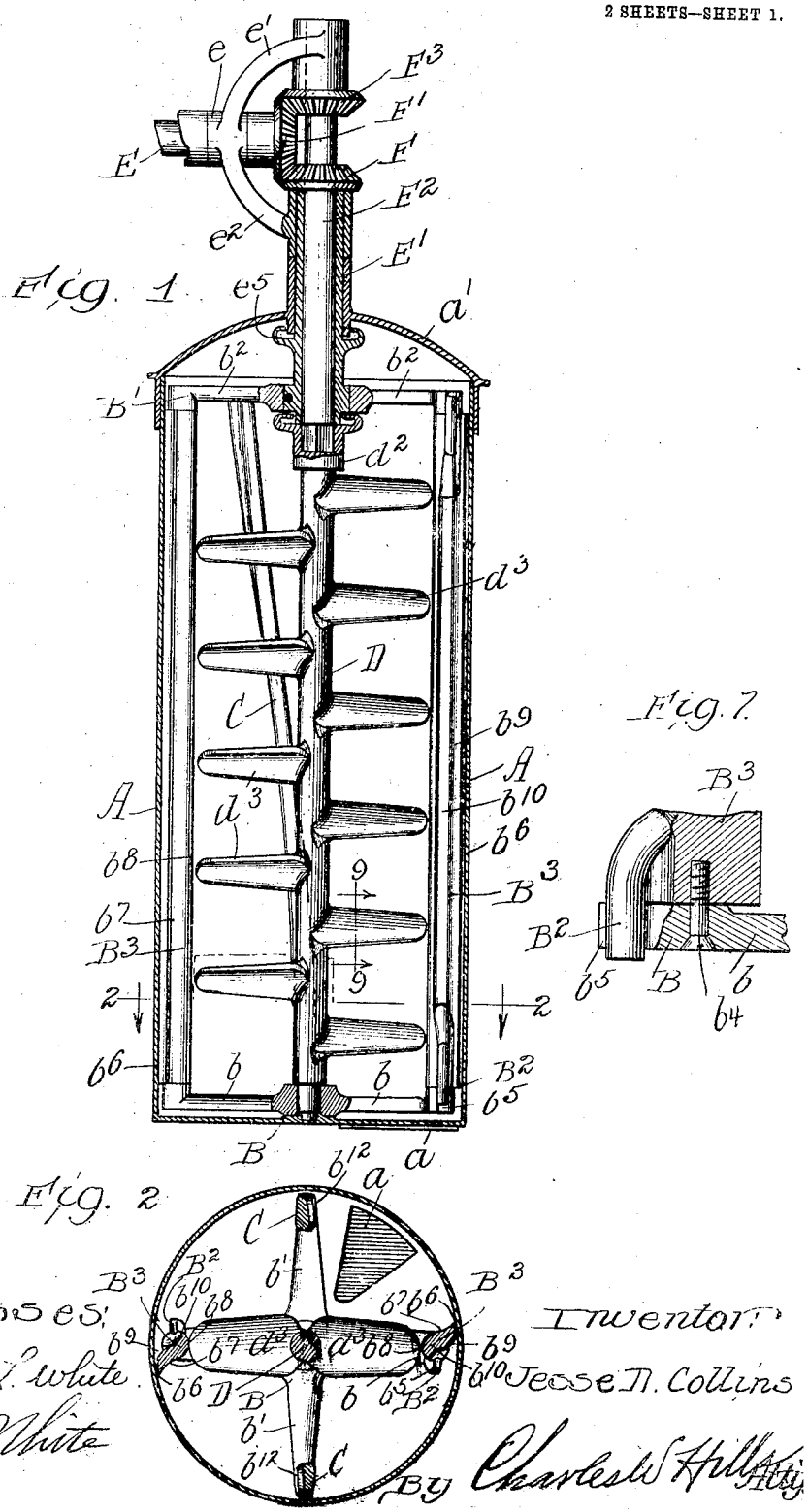

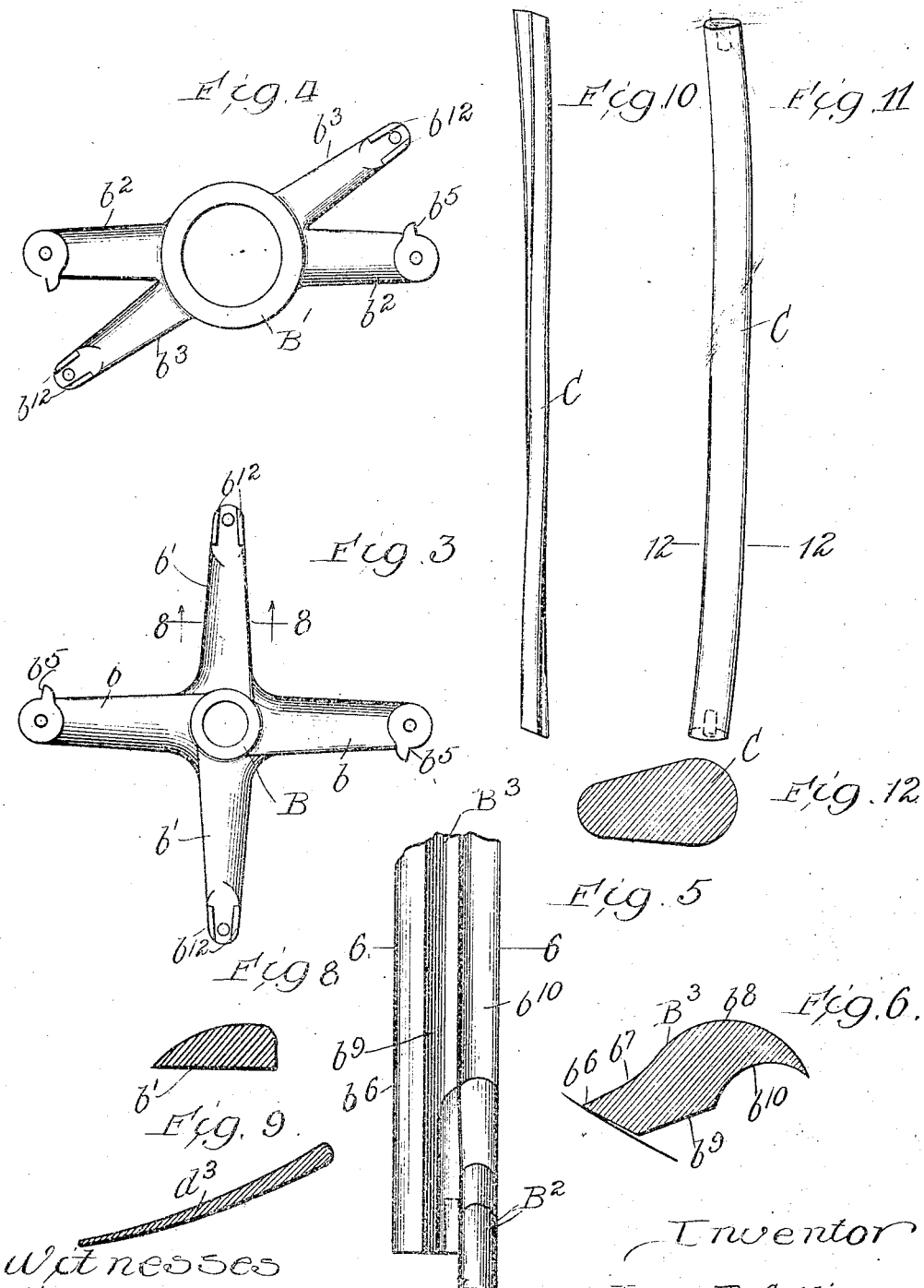

JESSE D. COLLINS, OF CHICAGO, ILLINOIS, ASSIGNOR, BY MESNE ASSIGNMENTS, TO THE CREAMERY PACKAGE MFG. COMPANY.

MECHANISM FOR FREEZERS.

943,735.   Specification of Letters Patent.   Patented Dec. 21, 1909.

Application filed February 28, 1906. Serial No. 303,383.

*To all whom it may concern:*

Be it known that I, JESSE D. COLLINS, a citizen of the United States, and a resident of the city of Chicago, in the county of Cook and State of Illinois, have invented certain new and useful Improvements in Mechanisms for Freezers; and I do hereby declare that the following is a full, clear, and exact description of the same, reference being had to the accompanying drawings, and to the letters of reference marked thereon, which form a part of this specification.

This invention relates to a mechanism for freezers and more particularly to a mechanism for ice cream freezers embracing mechanism for mixing smoothing and aerating the cream including scrapers and mechanism for forcing the frozen mixture or cream downwardly. Heretofore in freezers though central rotary beaters have been employed they have usually been so constructed as to merely mix the cream with slight lifting effect and very little if any smoothing effect and where laterally disposed scrapers are employed in conjunction with beaters they usually are provided with flat faces and the edges soon become dull and in consequence do not cut the cream from the can.

It is an object of this invention to provide a mechanism for ice cream freezers embracing central rotary beaters so constructed and formed as to lift and cause the cream and material to be frozen to flow upwardly and also to rub and smooth the same during freezing and throw the same outwardly toward the periphery of the containing can, and also to embody in connection with said rotary beaters, oppositely revolving self sharpening knives adapted to scrape or cut the frozen cream from the sides of the can and deflect the same inwardly toward and into the path of the beaters, and at the same time to afford a smooth curved surface for contact with the cream from which the cream is delivered toward the wall of the can and during delivery is aerated.

It is a further object of the invention to provide a combination with the beaters and knife scrapers an inclined rounded and slightly curved platen which serves to rub the sides of the can and to press the frozen cream downwardly after passing the scrapers.

As a whole the invention has for its object a rapid freezing and thorough aerating and smoothing of the cream during freezing whereby is insured a texture and quality not otherwise attainable.

The invention has as a further object, a construction of the beaters, scrapers and platens such that the mechanism is in fact self cleansing, inasmuch as it presents no sharp angles to retain the cream and which when a valve in the bottom of the can being opened is adapted to free itself entirely of cream.

The invention consists in the matters hereinafter described and more fully pointed out and defined in the appended claims.

In the drawings: Figure 1 is a central vertical section of a device embodying my invention. Fig. 2 is a section taken on line 2—2 of Fig. 1. Fig. 3 is a top plan view of a lower spider. Fig. 4 is a bottom plan view of the upper spider. Fig. 5 is a rear view of one of the scrapers. Fig. 6 is a section taken on line 6—6 of Fig. 5. Fig. 7 is an enlarged fragmentary detail of the lower end of the scraper. Fig. 8 is a section taken on line 8—8 of Fig. 3. Fig. 9 is a section taken on line 9—9 of Fig. 1. Fig. 10 is a side elevation of one of the inclined rubbing bars. Fig. 11 is a rear view of the same. Fig. 12 is a section taken on line 12—12 of Fig. 11.

As shown in said drawings: A indicates the can to contain the cream or mixture to be frozen, and which as shown is provided with an aperture in the bottom closed by means of a valve or plate $a$ of any suitable construction, and which of course will be made fluid tight. A top or cover $a'$ shown as arched or rounded fits over and closes the can.

Within the can is provided the mechanism for agitating the mixture to be frozen embracing as shown a four arm spider B which is supported centrally on the bottom of the can and the arms $b$—$b'$ which are arranged approximately at right angles with each other and are each reduced in thickness at the front edges and beveled upwardly as shown in Figs. 2, 3 and 8 and act to scrape the cream or other material from the bottom of the can. Said arms are joined at the hub of the spider as shown in Fig. 3 to obviate the formation of an angle such as might retain the frozen material therein, it being an important object to the invention to construct all parts of the mechanism to facilitate self cleaning, and as shown a central cylindric aperture is provided through the hub of said spider to receive the lower end of the beater shaft D.

5. An upper spider B' is provided, comprising a hub having a central aperture therethrough and four radial arms $b^2$ and $b^3$ arranged oppositely in pairs. Said arms $b^3$ are at an angle of approximately fifteen degrees from the rear side of the arms $b^2$ as shown in Fig. 4. Said arms $b^2$ are connected with the corresponding arms with the lower spider B by means of the scrapers or knives $B^3$ each of which as shown comprises a metallic bar provided at each end with a pivot pin or bolt $b^4$ which engages in a suitable socket or aperture in the extremity of said arms $b$ and $b^2$ respectively and with an offset rearwardly directed stop $B^2$ one of which engages against a stop $b^5$ on each of said arms and acts to prevent said scraper knives being turned sufficiently outwardly by pressure to jam or injure the sides of the can but which instead permit the edges $b^6$ of the scraper to bear firmly against the can at all times when in operation as shown in Fig. 6. Said scrapers as shown are each provided with a sharp edge which engages against the inner periphery of the can for the entire height thereof and the inner face of the scraper knife is curved transversely to provide first a concave inward bend $b^7$ and then a convex outward bend $b^8$ the rear edge of which is directed toward the adjacent side of the can. The knife or scraper from its sharp edge rearwardly is flat and at an angle to clear the sides of the can and to afford sufficient thickness for the knife and the back side $b^9$ of the knife is flat to near the middle from which point it swerves inwardly as shown at $b^{10}$ and meets the rearward edge of said convex front or inner portion.

Rigidly secured at their ends on the corresponding arms $b'$—$b^3$ are the inclined bars C, each of which is oval in cross section and is curved to fit to the side of the can when in place with the thinner edge of the same directed forwardly.

Journaled at its lower end in the central aperture in said spider B is a dasher shaft D, which at its upper end is shaped to receive therein through the spider B' the shaft $F^2$ whereby the same is actuated. Said shaft D is enlarged at its upper end to afford a suitable socket for the shaft $F^2$ and at its top affords a chamber to receive and contain lubricant or journal wear that otherwise might contaminate the cream.

Secured diametrically opposite each other on said shaft D but arranged staggering as to height are horizontally lifting and smoothing blades or beaters $d^5$. These are relatively broad and are of a length to just clear the scraper knives and the inclined bars and as shown are arranged obliquely on the shafts as shown in Fig. 1 or with the rear edge higher than the front edge. Said beaters are concave on the upper side transversely and convex on the lower, and taper from the upper or thicker edge forwardly and downwardly to the lower edge as shown in Fig. 9. Thus no flat or angular faces are presented by said beaters to the cream or material to be treated. The extremity of each is rounded as shown in Figs. 1 and 2 and also at the point of junction of the same with the shaft the blade of the beater adjacent the shaft curves upwardly and downwardly thereof thereby avoiding an angle such as would afford lodgment for the cream and prevent the blades from being easily cleaned.

The scrapers or knives $B^3$ and the inclined bars C are rotated in one direction on the spiders while the dasher or beater shaft is rotated in the other. For this purpose any suitable source of power may be used and may be communicated to the mechanism by means of a horizontal shaft E journaled in suitable bearings $e$ from which extend upper and lower arms $e'$—$e^2$ affording at their ends bearings, in the lower of which is journaled a tubular shaft E' on the upper end of which is rigidly secured a beveled gear F, which meshes with a gear F' on the shaft E. Said tubular shaft extends downwardly through the cover $a'$ of the can and is rigidly engaged in any suitable manner in the central bore of the upper spider B' with its end in the oil chamber of the beater shaft D. An upwardly directed flange $e^5$ is provided on said tubular shaft beneath the cover which serves to catch and retain any lubricant on said shaft. Extending through the tubular shaft E' and journaled at its upper end in the bearing on the arm $e'$ is a shaft $F^2$ and secured thereon is a beveled gear $F^3$ which meshes with the driving gear F' opposite the beveled gear F and consequently is driven oppositely. The lower end of said shaft $F^2$ is rigidly engaged in the socket at the upper end of the beater shaft D rotating the same oppositely from the spiders.

The operation is as follows: The shaft E drives the shaft E' and the shaft $F^2$ oppositely in consequence rotating the spiders bearing the scrapers and inclined bars in one direction and driving the beaters in the other. The direction of rotation of the spiders is of course such as to bring the sharp thin edge of the scrapers or knives in contact with the wall of the steel can and inasmuch as the knives are of copper, bronze or other relatively soft metal, the shape of said knives and the direction of rotation against the cream forces the blade thereof firmly against the sides of the can cutting the cream therefrom and further more owing to the difference in hardness, insuring that the knives or scrapers are at all times kept sharp by the frictional engagement against the can. The stops $B^2$ and $b^3$ serve to limit the outward movement of the knives to the surface of the can and the wear at the edge of the knives is usually about equal with corresponding wear on said stops so that the edges of the knives are at all times kept sharp and in positive bearing against the can. Should however said stops wear less rapidly than the edges of said scrapers the same may be occasionally reduced in thickness to permit the knives to again engage the can though in practice this will not be necessary.

As the scrapers or knives rotate against the cream cutting the same from the can the cream is rolled or flows inwardly over the concave and convex faces thereof conforming closely therewith, and a portion thereof is engaged by the beaters which owing to their upward inclination serve to elevate the same throw the same outwardly and a portion rolls around the rear edge of the knives and owing to the longitudinal concavity in the rear side thereof a space is left unfilled by cream at the rear of the knife and considerable suction is produced through the cream thus drawing air into the same and serving to increase its volume while materially increasing the smoothness of the same. Immediately following the knives or scrapers are the rounded inclined bars the rounded edges of which bear lightly against the surface of the can and serve to wipe the same and rub the cream and force it downwardly toward the bottom of the can and to also force the same inwardly in the path of the beaters.

The rapid revolution of the beater shaft in the direction of the lower edges of the blades acts to constantly lift the cream from the bottom of the can toward the top of the same and owing to the concavity and breadth of each blade and the inclination of the same upon the beater shaft the cream in passing over the blade is rubbed thereby and clings closely thereto for the entire passage thereacross and is also carried outwardly toward the periphery of the can. It is to be observed that owing to the shape of said beaters and the absence of angles such as would retain the cream therein the beaters and all parts of the mechanism are what may be termed self cleaning. That is to say, the shape is such as to facilitate the cream when frozen falling therefrom owing to the absence of such angular spaces as would permit the cream to remain therein.

When the freezing operation is completed the valve $a$ at the bottom of the can may be opened and the continued operation of the mechanism forces the cream rapidly from the can through said bottom aperture or valve due to the action of gravity, the scrapers and inclined bars and the fact that the rotation of the mechanism within the freezers create pressure on the cream causing the same to flow in lines of least resistance and in consequence the cream is discharged uniformly and rapidly from the freezers because of its self clearing or cleaning properties before described.

Preferably the beaters knives or scrapers and platen as well as the spiders are constructed of relatively soft metal capable of a polish such as copper or brass.

Obviously many details of construction may be varied without departing from the principles of my invention.

I claim as my invention:

1. The combination with a freezer can of spiders rotative therein one at the bottom and one at the top, scraper knives pivotally engaged at the ends of the corresponding arms of said spiders and comprising a relatively soft bar having a thin sharp edge adapted to engage against the can in the direction of rotation, a stop limiting the outward swing of said knives, the front faces of said knives being partly concave and partly convex.

2. The combination with a containing can of a spider at the bottom and at the top thereof, that at the bottom having arms, thin edged on the front side thereof and running close to the bottom, knives pivotally engaged to corresponding arms of said spiders and adapted to bear against the inner faces of the can, complemental stops on said knives and said arms to limit the outward swing of the edges thereof, the front surface of said knives being compoundly curved transversely and at the rear edge directed outwardly and a longitudinal concave face at the rear side of each knife.

3. In a freezer the combination with the can, of a scraper knife adapted to be moved around the periphery thereof, stops limiting the outward movement of the edge of the knife, the face of said knife being curved rearwardly and backwardly and affording a thin rear edge and having a concave face at the rear side thereof, and an obliquely inclined rounded bar carried by said spiders and curved to fit to the periphery of the can and acting to force the cream downwardly.

4. In a device of the class described, a can, upper and lower spiders revoluble therein, scraping knives carried on the outer ends of corresponding arms on diametrically opposite sides of the spiders, rounded bars carried on alternate arms of the spiders and at their upper ends inclining forwardly and shaped for their length to fit to the periphery of the can and acting to wipe the can and press the cream therein downwardly.

5. In a device of the class described the combination with a can of upper and lower spiders revoluble therein, the lower spider having arms relatively thin on their front edges, scraping knives pivoted in corresponding spider arms and movable therewith against the surface of the can, rounded bars carried on alternate arms of the spider and inclining forwardly at their upper ends and shaped to fit to the sides of the can and to force cream downwardly therefrom, a beater revoluble oppositely from the spiders and embracing a vertical shaft, relatively broad blades alternately arranged on opposite sides thereof and inclining downwardly at their edges in the direction of rotation and concave transversely, said blades presenting rounded edges and ends and rounding upwardly and downwardly from their surfaces onto the shaft and mechanism for rotating the spider and beaters oppositely.

6. In a device of the class described a can, a rotative shaft therein, oppositely disposed staggered blades thereon having rounded edges and ends and tapering from the shaft to the extremity thereof, said blades concave on the upper surface and convex on the under surface, and bars adapted to wipe the sides of the can and force the contents downwardly, said bars being approximately oval in cross section.

7. In a bottom discharging machine of the class described the combination with a can of a shaft therein, horizontal, broad, obliquely inclined beater blades secured to the shaft and rounded at the edges and ends, said blades being joined to the shaft in curved lines to facilitate cleaning, knives rotatable in the can to scrape the sides thereof each knife having its rear face concave the entire length thereof, and bars alternating with the knives having smooth rounded faces adapted to wipe the material from the sides of the can and force it downwardly.

8. In a device of the class described a can, rotatable blades located centrally therein exposing rounded edges to the material in said can, scraping knives rotatable around the sides of the can each shaped on its rear side to create a suction and blades adapted to force the cream downwardly.

9. In a device of the class described the combination with a receptacle having a bottom discharge aperture of beaters rotatable in the receptacle adapted to force the cream upwardly and outwardly, knives scraping the sides of said receptacle, means traveling in the path of said knives adapted to force the material as scraped from the sides downwardly to the discharge aperture, and means having beveled front edges adapted to scrape the frozen cream from the bottom of the receptacle.

In testimony whereof I have hereunto subscribed my name in the presence of two subscribing witnesses.

JESSE D. COLLINS.

Witnesses:
W. W. WITHENBURY,
WM. C. SMITH.